US 6,380,980 B1

(12) United States Patent
Huang (10) Patent No.: US 6,380,980 B1
(45) Date of Patent: *Apr. 30, 2002

(54) METHOD AND APPARATUS FOR RECOVERING VIDEO COLOR SUBCARRIER SIGNAL (75) Inventor: Samson Huang, Cupertino, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,280

(22) Filed: Aug. 25, 1997

(51) Int. Cl.[7] .......................... H04N 9/45; H04N 9/455
(52) U.S. Cl. ...................... 348/505; 348/537; 348/540; 348/525; 348/530
(58) Field of Search ................................. 348/505, 506, 348/507, 508, 537, 339, 349, 726, 540, 525, 530, 531; 346/213; H04N 9/45, 9/455

(56) References Cited

U.S. PATENT DOCUMENTS

| 3,578,902 | A | * | 5/1971 | Monsay | 348/506 |
|---|---|---|---|---|---|
| 3,860,952 | A | * | 1/1975 | Tallent et al. | 348/498 |
| 4,015,288 | A | * | 3/1977 | Ebihara et al. | 348/498 |
| 4,333,103 | A | * | 6/1982 | Koiwa et al. | 348/519 |
| 4,370,672 | A | * | 1/1983 | Ross et al. | 348/506 |
| 4,488,170 | A | * | 12/1984 | Nillesen | 348/540 |
| 4,517,587 | A | * | 5/1985 | Aizawa et al. | 348/521 |
| 4,635,097 | A | * | 1/1987 | Tatami | 348/505 |
| 4,675,724 | A | * | 6/1987 | Wagner | 348/498 |
| 4,694,326 | A | * | 9/1987 | Demmer | 348/508 |
| 4,703,340 | A | * | 10/1987 | Balaban et al. | 348/505 |
| 4,714,954 | A | * | 12/1987 | Yoshinaka et al. | 348/498 |
| 4,847,678 | A | * | 7/1989 | McCauley | 348/537 |
| 4,860,090 | A | * | 8/1989 | Murata et al. | 348/604 |
| 4,860,120 | A | * | 8/1989 | Tamashita | 348/506 |
| 4,908,582 | A | * | 3/1990 | Kawano et al. | 331/1 A |
| 4,954,883 | A | * | 9/1990 | Belmares-Sarabis et al. | 348/584 |
| 4,970,581 | A | * | 11/1990 | Ogwynn | 348/527 |
| 4,977,445 | A | * | 12/1990 | Kawai | 348/505 |
| 5,025,310 | A | * | 6/1991 | Sekiya et al. | 348/506 |
| 5,068,717 | A | * | 11/1991 | Jenison | 348/527 |
| 5,068,905 | A | * | 11/1991 | Hackett et al. | 382/47 |
| 5,142,376 | A | * | 8/1992 | Ogura | 386/29 |
| 5,243,412 | A | * | 9/1993 | Goukura et al. | 348/506 |
| 5,325,093 | A | * | 6/1994 | Takamori | 341/155 |
| 5,355,171 | A | * | 10/1994 | Miyazaki et al. | 348/505 |
| 5,486,867 | A | * | 1/1996 | Hsu et al. | 348/516 |
| 5,526,055 | A | * | 6/1996 | Zhang et al. | 348/510 |

(List continued on next page.)

Primary Examiner—Reinhard J. Eisenzopf
Assistant Examiner—Linus H. Lo
(74) Attorney, Agent, or Firm—Blakely, Sokoloff, Taylor & Zafman LLP (57) ABSTRACT An embodiment of the present invention provides a signal generator for generating a signal with a predetermined frequency. The signal generator includes a first comparator for generating a first error signal and a second comparator for generating a second error signal. The first and second comparators are coupled to an oscillator configured to receive the first and second error signals and generate the signal having a predetermined frequency. Another embodiment of the present invention provides a signal generator for generating a signal with a predetermined frequency. The signal generator includes a counter for generating a first count, Q_last. The counter is coupled to a ratio counter which generates a signal having a value less than or equal to Q_last. The contents of the ratio counter represent the phase of the signal having a predetermined frequency. The ratio counter outputs the signal having a predetermined frequency.

13 Claims, 5 Drawing Sheets

U.S. PATENT DOCUMENTS

| | | | | |
|---|---|---|---|---|
| 5,534,939 A | * | 7/1996 | Nakamura et al. | 348/505 |
| 5,557,426 A | * | 9/1996 | Sakata | 358/448 |
| 5,621,478 A | * | 4/1997 | Demmer | 348/639 |
| 5,691,780 A | * | 11/1997 | Marshall et al. | 348/743 |
| 5,786,866 A | * | 7/1998 | Sani et al. | 348/520 |
| 5,794,119 A | * | 8/1998 | Evans et al. | 455/6.2 |
| 5,808,691 A | * | 9/1998 | Malcolm et al. | 348/537 |
| 5,844,622 A | * | 12/1998 | Hulvey | 348/546 |
| 6,028,642 A | * | 2/2000 | Rinaldi et al. | 348/540 |
| 6,038,276 A | * | 3/2000 | Dinh | 375/376 |
| 6,052,152 A | * | 4/2000 | Malcolm, Jr. et al. | 348/537 |
| 6,133,964 A | * | 10/2000 | Han | 348/726 |

* cited by examiner

METHOD AND APPARATUS FOR RECOVERING VIDEO COLOR SUBCARRIER SIGNAL

FIELD OF THE INVENTION

This invention relates to systems for generating signals, and more particularly, to those systems which recover the color subcarrier signal and horizontal synchronization signal for digital video.

BACKGROUND

To convert an analog composite video signal into a digital video signal, the analog composite video signal must first be sampled by an analog-to-digital converter to create a digital composite video signal. The digital composite video signal is then converted by a digital video encoder to become digital component video. Techniques to convert an analog composite video signal into a digital component video signal are known in the art.

The digital component video signal is composed of a series of discrete, pixelized scan lines. Since there are a certain number of pixels per scan line and a certain number of scan lines per second encoding digital composite video a digital decoder requires a pixel clock. The pixel clock has frequency Fs that equals the number pixels per line times multiplied by the number of scan lines per second Fh.

One of the difficult aspects of the encoding process in a digital video encoder is chroma demodulation. The chroma portion of an analog video signal placed on a color subcarrier signal Fsc with a frequency of 3.579545 MHz. The hue (or color) value of pixel is determined by the phase difference of the color subcarrier signal during the pixel from a color burst reference signal. Television standards stipulate that the color subcarrier signal frequency be accurate to within +/−10 Hz. Inaccurate color subcarrier signal frequency precludes accurate reproduction of the color information. Therefore, a very accurate Fsc signal is required to demodulate chroma accurately.

Unfortunately, a digital video encoder must work with two separate signals with different frequencies: the pixel clock Fs and the color subcarrier signal Fsc. The standard pixel clock Fs and the color subcarrier signal Fsc do not have a simple integer multiple relationship. Moreover, since the input analog composite video signal is not likely to be stable (e.g., from VCR) there is likely to be a significant variation in the horizontal synchronization frequency Fh. If horizontal synchronization frequency Fh varies, while the pixel clock frequency stays fixed at Fs, some lines will have more or less pixels than the other lines and there will be inaccurate color demodulation.

The conventional solution for maintaining a proper relationship between the pixel clock Fs and the horizontal synchronization frequency Fh is to use a phase-locked loop (PLL) that generates a pixel clock signal that is synchronized with the input video signal. The problem with using a PLL to generate a pixel clock is that a PLL is usually implemented as an analog circuit. Thus, it is difficult to integrate an analog PLL into a digital video encoder design. Digital PLLs exist but they are hard to design.

If the problem of maintaining a proper relationship between the pixel clock Fs and the horizontal synchronization signal Fh is solved there still remains the problem of generating an accurate color subcarrier signal with frequency Fsc. The conventional solution for generating the color subcarrier signal has been to use a ratio counter.

The ratio between Fsc and Fs can be represented as the ratio p/q where p and q are two integers. Since Fs is greater than Fsc, whenever a pixel clock running at Fs completes one cycle, a clock generating Fsc would have completed p/q of one cycle. Using a ratio counter, a clock to generate Fsc can be obviated because for every clock pulse from the pixel clock the ratio counter can be incremented by p. During each clock cycle, the output of the counter expresses the phase of the color subcarrier signal as a fraction of one period of the pixel clock's frequency, Fsc. Thus, the contents of the counter can be used as an index to a look-up table containing the amplitude of a sine wave for all possible values that can be stored in the counter. Using the look-up table, the phase can be translated to a corresponding amplitude.

A problem with generating the color subcarrier indirectly from a pixel clock is that the accuracy of the color subcarrier is very hard to control because the pixel clock is locked to the horizontal synchronization signal Fh that may vary by +/−8%. Additionally, many errors can exist in different parts of the horizontal timing recovery and clock generation circuits that also affect the accuracy of color subcarrier Fsc. For example, in a conventional design, the look-up table for a phase-to-amplitude translator requires at least 2048 entries and still carries up to +/−0.08% error that results in additional subcarrier phase error. Television standards stipulate that the color subcarrier frequency be accurate to within +/−10 Hz. Inaccurate subcarrier frequency precludes accurate reproduction of the color information.

Thus, it would be highly desirable to reproduce color more accurately and with circuitry less complicated than the mixed digital/analog PLL method.

SUMMARY OF THE INVENTION

An embodiment of the present invention provides a signal generator for generating a signal with a predetermined frequency. The signal generator includes a first comparator for generating a first error signal and a second comparator for generating a second error signal. The first and second comparators are coupled to an oscillator configured to receive the first and second error signals and generate the signal having a predetermined frequency.

Another embodiment of the present invention provides a signal generator for generating a signal with a predetermined frequency. The signal generator includes a counter for generating a first count, Q_last. The counter is coupled to a ratio counter which generates a signal having a value less than or equal to Q_last. The contents of the ratio counter represent the phase of the signal having a predetermined frequency. The ratio counter outputs the signal having a predetermined frequency.

BRIEF DESCRIPTION OF THE DRAWINGS

The present invention is illustrated by way of example, and not limitation, in the figures of the accompanying drawings in which.

DETAILED DESCRIPTION

A method and apparatus for generating signals used for video processing is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to NTSC video standard. However, the same techniques can easily be applied to other video standards such as the PAL and SECAM video standards.

A Color Subcarrier Frequency Based Pixel Clock

Figure 1A:
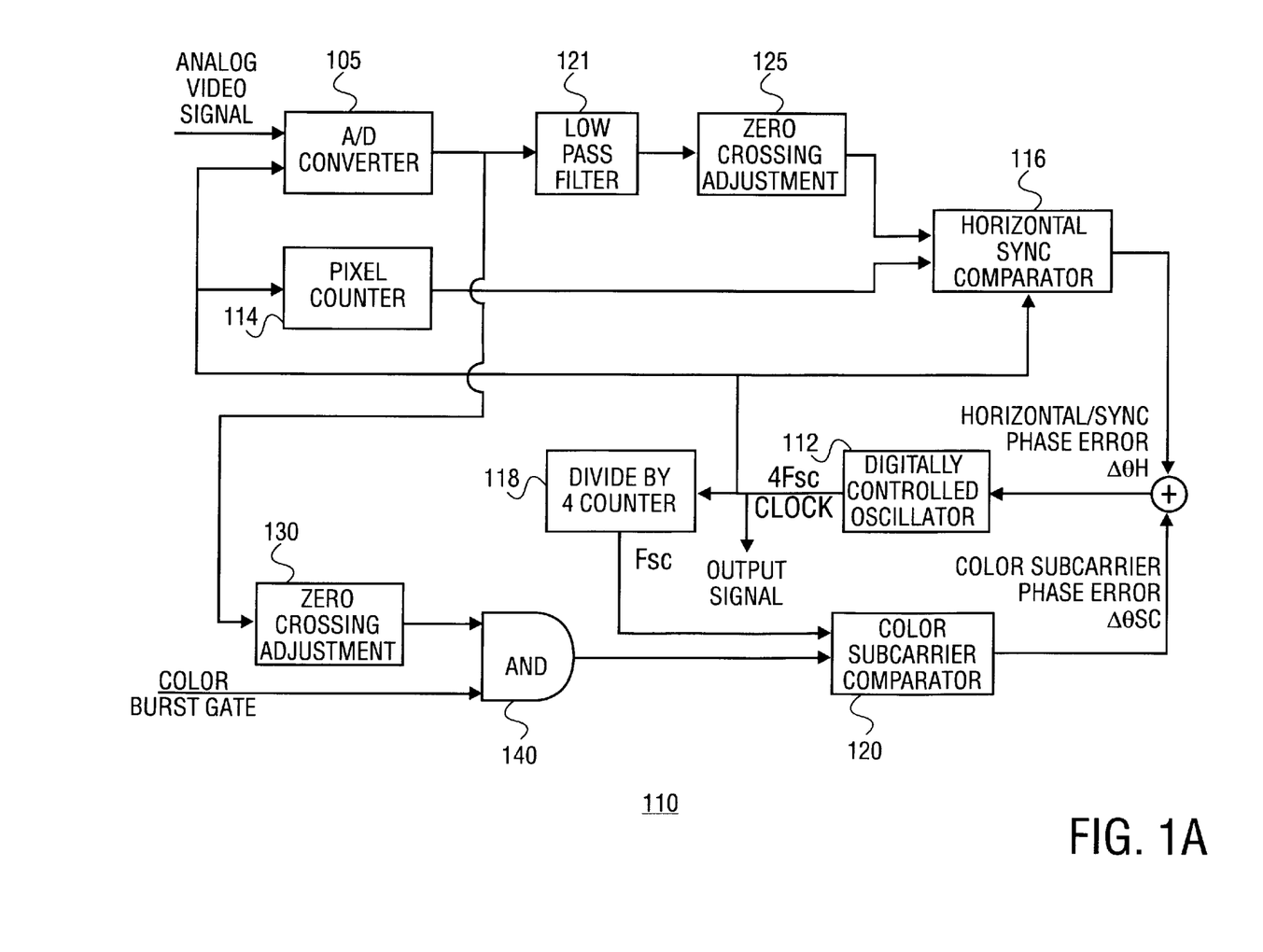
FIG. 1a illustrates a block diagram of a circuit that creates a 4*Fsc clock using a recovered horizontal sync and recovered color subcarrier to maintain synchronization.

FIG. 1a illustrates a signal generator 110 which is in accordance with the present invention. The signal generator 110 of FIG. 1a is used to generate an output signal with a frequency that is an integer multiple N of the television color subcarrier frequency Fsc. In the NTSC video standard, the color subcarrier frequency Fsc is defined as 3.579545 MHz. The integer multiple N is chosen to be large enough such that the output N*Fsc signal can be used as a pixel clock for sampling pixels.

In the embodiment of FIG. 1a, the signal generator 110 generates a signal that is four times the color subcarrier frequency (N=4), thus the output signal is:

$$4*Fsc = 14.31818 \text{ MHz}$$

The 4*Fsc signal is generated by a digitally controlled oscillator 112. The digitally controlled oscillator 112 is controlled by two different control loops: a horizontal sync control loop and a color subcarrier control loop. Each control loop uses a comparator to supply an error signal to the digitally controlled oscillator 112.

Horizontal Synchronization Control Loop

The horizontal sync control loop compares the horizontal synchronization recovered from an input video signal with a horizontal synchronization pulse that is generated using the 4*Fsc output signal.

To recover the horizontal synchronization from the input video signal, the digitized input video signal is first passed through a low pass filter 121 to remove the higher frequency components. Then, the filtered signal is processed by a zero crossing adjuster 125 such that the horizontal synchronization pulse is at the zero point.

To generate a horizontal synchronization pulse from the 4*Fsc output signal, a fixed relationship between the 4*Fsc pixel clock and the horizontal synchronization pulse is used. Specifically, since the input video signal will be sampled using 4*Fsc as a pixel clock, a horizontal synchronization pulse can be generated by dividing the 4*Fsc pixel clock by the number of pixels in a line.

In the NTSC standard, the video frame rate is 59.94 frames per second wherein each video frame comprises 525 video scan lines. Each video frame is built up of two interlaced fields that are interlaced at a ratio of 2:1. Therefore, the horizontal synchronization frequency, Fh, is defined as $$Fh = 59.94*(525/2) = 15734.25 \text{ Hz}$$

Thus, the number of pixels per scan line (HCNT) in a system clocked by a 4*Fsc pixel clock is defined as follows:

$$HCNT = N*Fsc/Fh$$

$$HCNT = (14.31818 \text{ MHz})/15734.25 \text{ Hz}$$

$$HCNT = 910$$

Thus, to generate a horizontal synchronization pulse using the 4*Fsc output signal, the 4*Fsc output signal is applied to a pixel counter 114 that counts to a predetermined horizontal pixel count (HCNT) value of 910 pixels per scan line.

Referring again to FIG. 1a, pixel counter 114 is driven by the digitally controlled oscillator 112 that is generating 4*Fsc frequency signal. The pixel counter 114 counts up to HCNT and generates a horizontal synchronization pulse when it reaches HCNT. (The pixel counter 114 wraps back to zero for the next count.) The horizontal synchronization comparator 116 compares the horizontal synchronization pulse generated using the 4*Fsc output signal with a horizontal synchronization signal recovered from the analog video source. The horizontal synchronization comparator 116 generates a horizontal synchronization phase error signal that is used to adjust the digitally controlled oscillator 112.

Figure 1B:
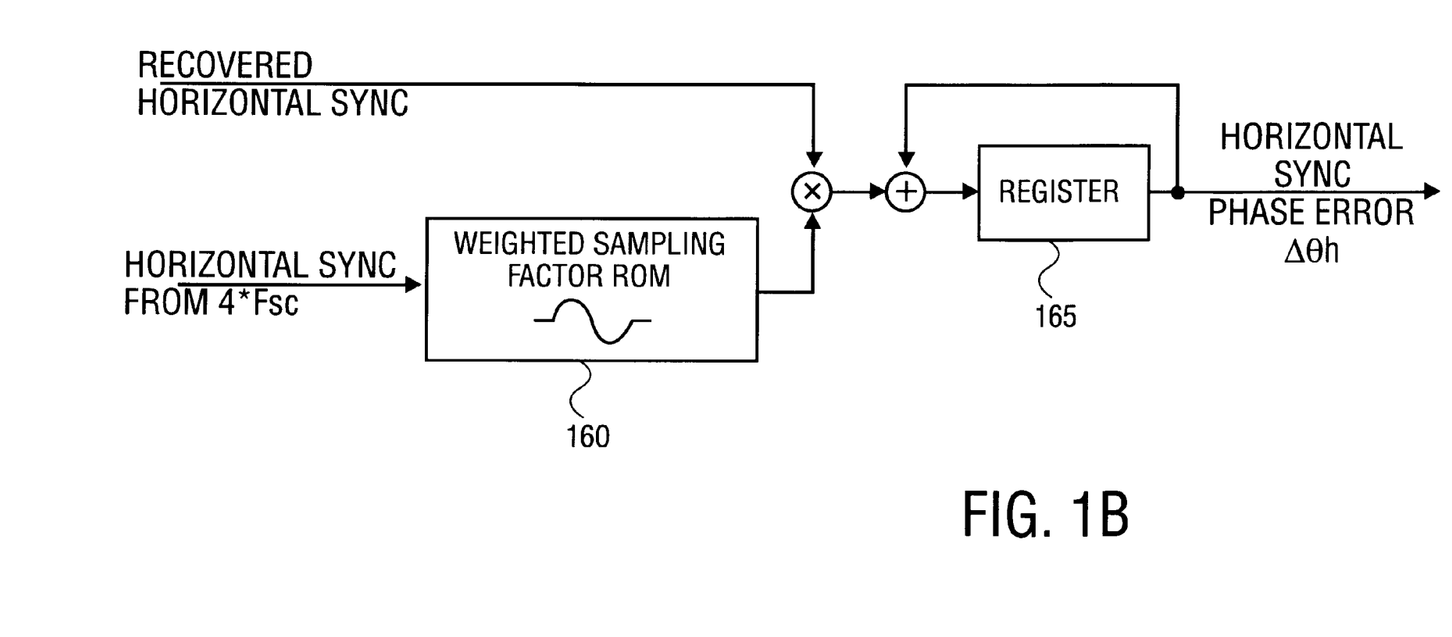
FIG. 1b illustrates a block diagram of one possible horizontal synchronization comparator circuit.

FIG. 1b illustrates one possible horizontal synchronization comparator 116 implementation. In the implementation of FIG. 1b, the horizontal synchronization pulse generated from the 4*Fsc signal is processed with a weighted sampling factor ROM 160. The weighted sampling factors will cause the processed signal to generate a positive value if the horizontal synchronization pulse generated from the 4*Fsc is behind the horizontal synchronization pulse recovered from the video signal and a negative value if the horizontal synchronization pulse generated from the 4*Fsc is ahead of the horizontal synchronization pulse recovered from the video signal. This value is accumulated in register 165 that generates the horizontal synchronization phase error signal.

Color Subcarrier Control Loop

The color subcarrier control loop compares a color subcarrier signal recovered from an input video signal with a color subcarrier signal that is generated using the 4*Fsc output signal. As previously set forth, the digitally controlled oscillator 112 generates a signal having a frequency of four times the color subcarrier signal (4*Fsc). Thus, to generate the Fsc color subcarrier signal, a simple divide by four is performed by frequency division circuit 118.

The color subcarrier signal is recovered from input video signal by logically ANDing the input signal during the "back porch" of the vertical synchronization pulse. Specifically, the digitally sampled video signal is first adjusted by zero crossing adjuster 130 such that the "back porch" where the color subcarrier reference signal is placed is at the zero point. Then, adjusted signal is logically ANDed by AND gate 140 with a burst signal that is active during the "back porch." The recovered color subcarrier reference signal is then provided to comparator 120. Comparator 120 compares the color subcarrier reference signal recovered from the input video signal with the Fsc output of the frequency division circuit 118 and generates a color subcarrier phase error signal. The color subcarrier phase error signal is used to adjust the digitally controlled oscillator 112.

Figure 1C:
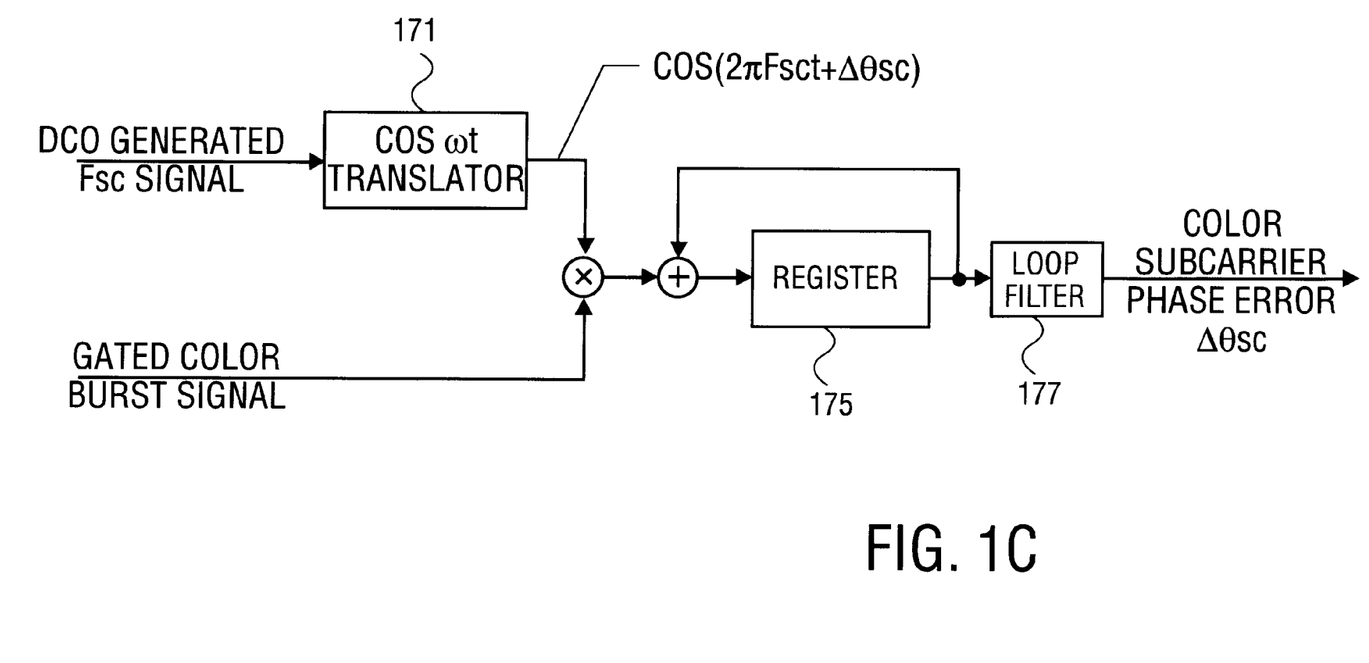
FIG. 1c illustrates a block diagram of one possible color subcarrier comparator circuit.

FIG. 1c illustrates one possible color subcarrier comparator 120 implementation. In the implementation of FIG. 1c, the Fsc color subcarrier signal generated from the 4*Fsc signal. The 4*Fsc signal is processed with a cosine translator 171 to generate the Fsc color subcarrier signal. The translated color subcarrier is then multiplied with the gated color burst signal from the video input. The output value is accumulated in register 175 which generates the color subcarrier phase error signal. The color subcarrier phase error signal can be further processed by a loop filter 177 to filter out the high frequency components.

Thus, referring back to FIG. 1a, the oscillator 112 receives both a horizontal synchronization phase error signal and a color subcarrier phase error signal. The horizontal synchronization phase error signal and the color subcarrier phase error signal are used to produce an accurate 4*Fsc signal that remains synchronized with the input video signal. Thus, if the input video signal varies from the published standard, the generate 4*Fsc signal will vary accordingly. The 4*Fsc signal can be used as a pixel clock for sampling pixels.

Unlike the prior art devices that use a pixel clock locked to the horizontal synchronization signal to generate the subcarrier signal, the present invention enjoys more accurate color reproduction by generating directly a signal with a frequency which is a predetermined integer multiple of the color subcarrier frequency and locking it to both the horizontal synchronization signal and the color burst video signal. The prior art devices use a look-up ROM table for phase to amplitude translation which, at 2048 entries, have up to +/−0.08% error in amplitude which results in inaccurate color subcarrier frequency signal generation. By generating a pixel clock signal which has a frequency that is an integer multiple N of the color subcarrier frequency Fsc, the N*Fsc pixel clock signal can be easily and accurately transformed into a signal having the color subcarrier frequency by dividing by a factor of N. Moreover, unlike the prior art devices that use a phase-locked loop to generate the pixel clock, the present invention enjoys the simplicity and ease of implementation afforded by a purely digital design.

Application of the Signal Generator

Figure 2:
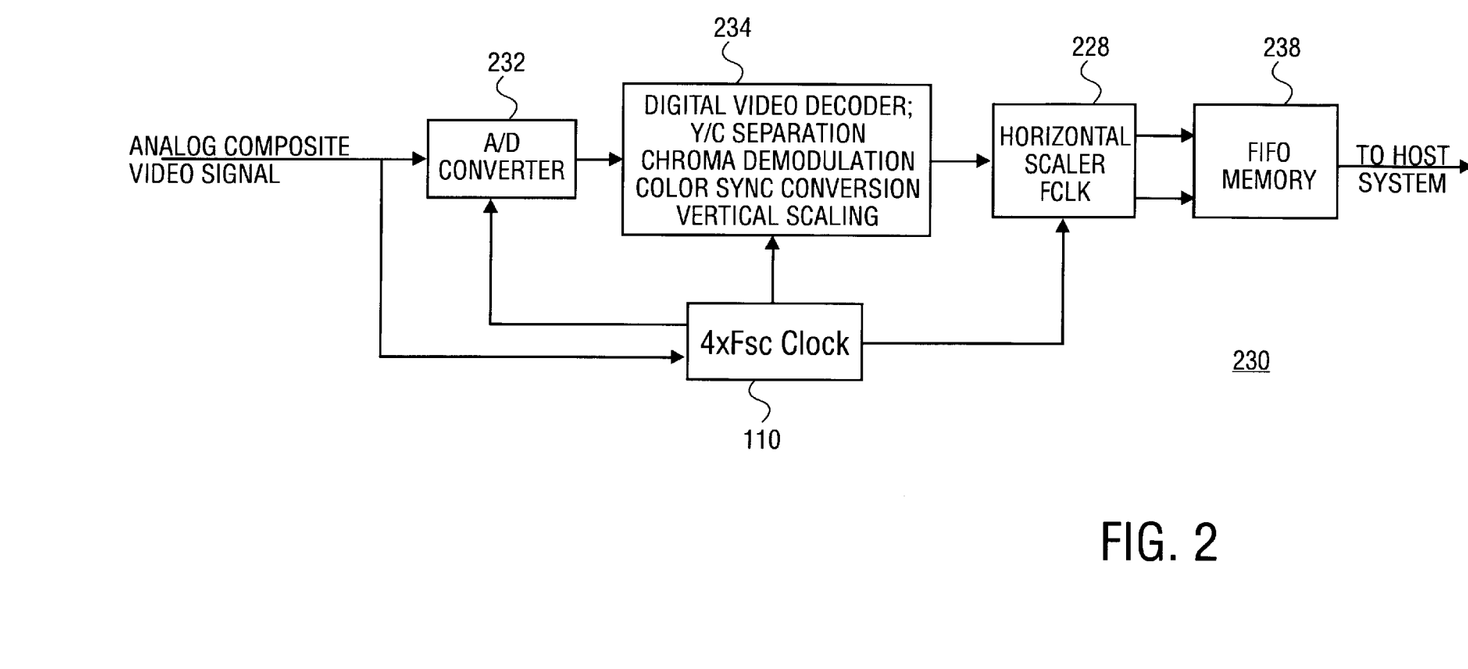
FIG. 2 illustrates a block diagram of a digital video decoding system employing the signal generator of FIG. 1.

FIG. 2 illustrates an application of the present invention. A digital video encoding system 230 includes an analog-to-digital converter 232, the signal generator 110 of FIG. 1a, a digital video encoder 234, a horizontal scaler 236, and a FIFO memory 238. The signal generator 110 generates a four times color subcarrier frequency signal (4*Fsc) as previously set forth. The analog-to-digital converter 232 receives an analog composite video signal from an analog video source and the four times color subcarrier frequency signal (4*Fsc). The analog-to-digital converter 232 samples the analog composite video signal at a frequency four times the color subcarrier frequency and generates digital composite video.

The digital composite video and the four times color subcarrier frequency signal (4*Fsc) are applied to the digital decoder 234. The digital decoder 234 uses the four times color subcarrier frequency signal (4*Fsc) as a pixel clock and generates a digital component video output.

The digital component video is composed of pixelized scan lines and is applied to the horizontal scaler 228. The four times color subcarrier frequency signal is also applied to the horizontal scaler 228. The horizontal scaler 228 generates a write signal, FCLK, to the memory 238 which stores the pixelized scan lines. The frequency with which an FCLK is generated depends upon the level of scaling needed to go from the pixels generated by the sampling process to the pixels used by the host system's display (not shown).

For example, at a sampling frequency of four times the color subcarrier frequency (3.579545 MHz) and a horizontal synchronization frequency, Fh, of 15734.25 Hz 910 pixels are generated per line. Of these 910 pixels only 768 pixels are visible since the other 142 pixels occur during the horizontal blanking period and are thus invisible. All the invisible pixels are automatically skipped by de-asserting FCLK during the horizontal blanking period. For square pixel video, only 640 visible pixels in each line are written into the FIFO memory 238. These 640 pixels are generated from the original 768 pixels by the horizontal scaling process of the horizontal scaler 236, and 640 FCLKs are generated to write 640 pixels into the FIFO memory 238. If the host system's display is able to process all 768 pixels, a 20% up scaling is achieved without additional hardware cost.

A Fixed Pixel Clock Based Video Decoder

Figure 3:
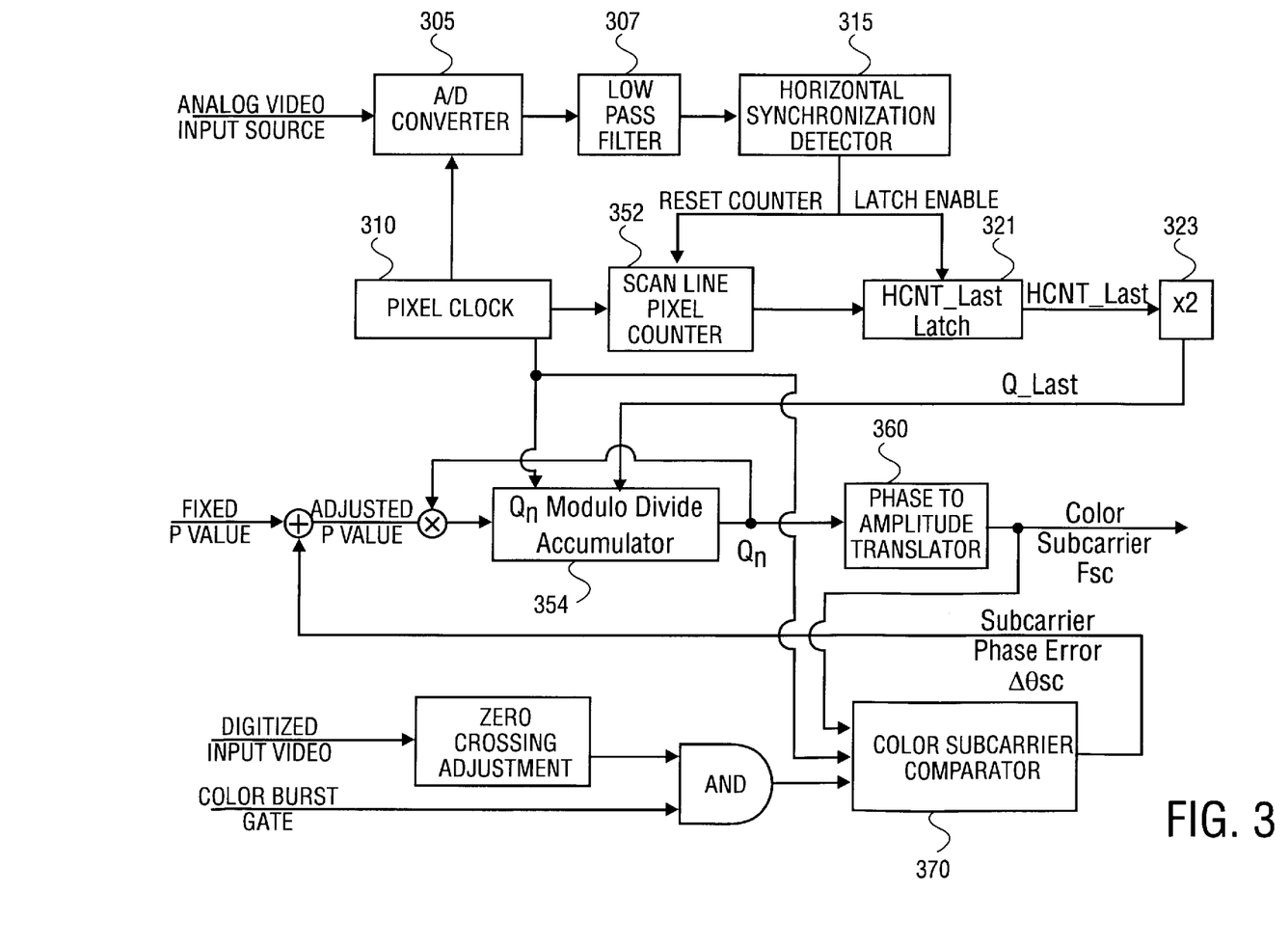
FIG. 3 illustrates a fixed pixel clock based color subcarrier generation circuit.

FIG. 3 illustrates another video processing circuit. The video processing circuit of FIG. 3 operates using a fixed pixel clock frequency, but the number of pixels sampled per line varies dependent upon the input video signal. The timing of the input video signal is determined by recovering the horizontal synchronization from the input video signal.

Referring to FIG. 3, an input video signal is digitized by an analog-to-digital converter 305. The analog-to-digital converter 305 is clocked by a fixed pixel clock signal that is generated from a crystal 310 or another stable clock signal generator. The digitized video signal is filtered by a low pass filter 307 and processed by a horizontal synchronization detector 315 that detects when the input video signal completes a scan line.

During each scan line, a pixel counter 352 counts the number of the number of pixels that exist on that scan line according to the fixed pixel clock signal generated by crystal 310. The pixel counter 352 is reset back to 1 when a horizontal synchronization indication occurs on the input video signal as detected by the horizontal synchronization detector 315. Since the timing of the input video signal will vary, the number of pixels per scan line will vary accordingly. To prevent an overflow, the pixel counter 352 must be able to count at least 20% more than the normal number of pixels per line.

At the end of each scan line, when a horizontal synchronization indication occurs, the contents of the pixel counter 352 will be latched into and HCNT_Last latch 321 that stores the number of pixels on the previous scan line. The number of number of pixels on the previous scan line is multiplied by multiplier 323 to generate a q_last signal. The q_last signal will be used to perform Quadrature Subcarrier Generation.

In a standard NTSC video system, the ratio of color subcarrier frequency Fsc to horizontal synchronization frequency Fh (Fsc/Fh) can be expressed as the ratio of two integers, p/2. For an NTSC system, the ratio Fsc/Fh equals 455/2. There is also an even integer relationship between the pixel frequency Fs and the horizontal synchronization frequency Fh, name Fs=(pixels/line)*Fh. In square pixel system using the NTSC video standard, the relationship is Fs=780*Fh. Thus, the ratio between the color subcarrier frequency Fsc and the pixel clock frequency Fs is Fsc/Fs= p/(2*(pixels/line)).

In the present system, the number of pixels per line varies depending upon the input video signal. Thus, the ratio will vary in the present system. Specifically, ratio between the color subcarrier frequency Fsc and the pixel clock frequency Fs is Fsc/Fs in the present system can be defined as p/(2*HCNT_Last)) or p/q_last.

FIG. 3 illustrates how the q_last value is used to generate a color subcarrier Fsc. Referring to FIG. 3, q_last, the pixel clock, and the previous output are all are applied to modulo divide accumulator 354. Since Fs is greater than Fsc, whenever the pixel clock running at Fs completes one cycle, a clock generating Fsc would have completed a fraction, p/q_last, of one cycle of the pixel clock. Using the modulo divide accumulator 354, a clock to generate Fsc can be obviated because for every clock pulse from the pixel clock the modulo divide accumulator can be incremented by p. The contents of the modulo divide accumulator 354 represent the phase of the color subcarrier signal having a frequency Fsc. The contents of the modulo divide accumulator 354 are controlled by these equations:

$$Q_n = Q_{n-1} + p \text{ if } (Q_{n-1} + p) < q\_\text{last};$$

$$Q_n = Q_{n-1} + p - q\_\text{last if } (Q_{n-1} + p) \geq q\_\text{last};$$

The contents of the modulo divide accumulator 354 is applied to a Phase to Amplitude translator 360. The Phase to Amplitude translator 360 uses the contents of the modulo divide accumulator 354 as an index into a look-up table containing the amplitude of a sine wave for an Fsc color subcarrier signal.

For further refinement, the color subcarrier signal is applied to a color subcarrier comparator 360. A color subcarrier signal recovered from the digitized input video signal is also applied to the color subcarrier comparator 360. The color subcarrier comparator 360 generates an color subcarrier phase error signal. The color subcarrier phase error signal is used to adjust the p value used in the modulo divide accumulator 354 to compensate for the mismatch between the recovered color subcarrier signal and the color subcarrier signal produced by the modulo divide accumulator 354. The color subcarrier comparator 360 may be implemented as illustrated in FIG. 1c.

Thus, a novel system for recovering a color subcarrier signal from video signal has been disclosed. Although discussed with reference to specific embodiments and the accompanying illustrations, it should be appreciated that the present invention is applicable to a variety of carrier recovery systems. Accordingly, the invention should only be measured in terms of the claims which follow.

What is claimed is:

1. A method for generating a video clocking signal, comprising:
    producing an output video clocking signal from an oscillator;
    receiving a reference video signal;
    generating a first error signal by comparing a first aspect of said reference video signal with a first aspect of said output video clocking signal;
    generating a second error signal by comparing a second aspect of said video reference signal with a second aspect of said video clocking output signal, generating a horizontal sync signal from a counter, generating weighted sampling factors, and producing a product of weighted sampling factors and the horizontal sync signal; and
    adjusting said oscillator using the first error signal and the second error signal.

2. The signal generator of claim 1, wherein:
    the second aspect of said video clocking signal is the phase of a generated horizontal sync signal;
    the second aspect of said reference video signal is the phase of the horizontal sync signal from the counter; and
    the second error signal is an accumulated value which becomes a positive value if the generated horizontal sync signal is behind the horizontal sync signal from the counter, and becomes a negative value if the generated horizontal sync signal is ahead of the horizontal sync signal generated from the counter.

3. The signal generator of claim 1, wherein a multiple of the video clocking signal is used to sample the reference video signal.

4. An apparatus comprising:
    a horizontal sync comparator receiving a reference horizontal sync signal and a generated horizontal sync signal, and generating a horizontal sync error signal, said horizontal sync comparator comprising:
        a weighted sampling factors ROM coupled to the pixel counter and configured to generate weighting factors,
        a multiplier coupled to the weighted sampling factors ROM and configured to generate a product of the weighting factors and the reference horizontal sync signal, and
        an accumulator coupled to the multiplier and configured to generate the horizontal sync error signal; and
    a digitally controlled oscillator coupled to the horizontal sync comparator to receive the horizontal sync error signal and to generate an output signal.

5. The apparatus of claim 4, further comprising a color subcarrier comparator receiving a reference color subcarrier signal and a generated color subcarrier signal, and generating a color subcarrier error signal; and where in the digitally controlled oscillator is coupled to the color subcarrier comparator to receive the color subcarrier error signal.

6. The apparatus of claim 5, wherein the output signal generated by the digitally controlled oscillator is used to generate the generated horizontal sync signal and the generated color subcarrier signal.

7. The apparatus of claim 5, wherein the output signal generated by the digitally controlled oscillator is a multiple of a pixel clock, and said multiple of a pixel clock is used to sample a reference video signal comprised of the reference horizontal sync signal and the reference color subcarrier signal.

8. The apparatus of claim 4, wherein the horizontal sync error signal is a value accumulated in a register which becomes a positive value if the generated horizontal sync signal is behind the reference horizontal sync signal, and becomes a negative value if the generated horizontal sync signal is ahead of the reference horizontal sync signal.

9. A video signal generator, said video signal generator comprising:
    a fixed pixel clock generator;
    a counter coupled to said fixed pixel clock generator, said counter to count a number of pixels during each horizontal scan line of a reference video signal;
    a ratio counter coupled to the counter, the ratio counter to generate a phase signal; and
    a phase to amplitude converter, said phase to amplitude converter receiving said phase signal to generate an output color subcarrier signal.

10. The video signal generator of claim 9 further comprising: a phase comparator coupled to the ratio counter, the phase comparator configured to receive the output color subcarrier signal and the reference video signal and configured to generate an color subcarrier error signal.

11. The signal generator of claim 9, wherein the ratio counter receives twice the number of pixels received during the previous horizontal scan line.

12. The signal generator of claim 10, wherein the phase comparator compares a color burst signal form the reference video signal with the output signal.

13. The signal generator of claim 9, wherein the fixed pixel clock generator generates a signal having a frequency of 12.27 Mhz.

* * * * *